United States Patent
Burdeaux

(10) Patent No.: US 10,306,985 B1
(45) Date of Patent: Jun. 4, 2019

(54) AUXILIARY SHELF FOR HUNTING STAND

(71) Applicant: David Burdeaux, Denton, MD (US)

(72) Inventor: David Burdeaux, Denton, MD (US)

( * ) Notice: Subject to any disclaimer, the term of this patent is extended or adjusted under 35 U.S.C. 154(b) by 0 days.

(21) Appl. No.: 15/985,793

(22) Filed: May 22, 2018

(51) Int. Cl.
*A01M 31/02* (2006.01)
*A47B 96/02* (2006.01)
*F16M 13/02* (2006.01)

(52) U.S. Cl.
CPC ........... *A47B 96/027* (2013.01); *A01M 31/02* (2013.01); *A47B 96/025* (2013.01); *F16M 13/022* (2013.01)

(58) Field of Classification Search
CPC .... A47B 96/027; A47B 96/028; A01M 31/02; A01M 31/025; F16M 13/02; F16M 13/022
See application file for complete search history.

(56) References Cited

U.S. PATENT DOCUMENTS

| | | | |
|---|---|---|---|
| 3,894,496 A * | 7/1975 | Phillips | A47B 5/00 108/50.11 |
| 4,913,394 A * | 4/1990 | Schmid | E06C 7/143 182/122 |
| 5,156,096 A | 10/1992 | Lamprey | |
| 5,427,344 A | 6/1995 | Beauchemin | |
| 5,469,934 A * | 11/1995 | Pherigo | A01M 31/02 108/152 |
| 5,706,740 A * | 1/1998 | Keller, Jr. | A47B 96/02 108/108 |
| 5,899,295 A * | 5/1999 | Arena | A01M 31/02 108/152 |
| 5,960,905 A * | 10/1999 | Gardner | E06C 7/143 182/129 |
| 6,205,935 B1 | 3/2001 | Lindaman | |
| 7,516,707 B2 | 4/2009 | Schrot | |
| 9,277,807 B2 | 3/2016 | Tichenor | |
| D789,717 S | 6/2017 | Renjillan | |
| 2008/0251318 A1 * | 10/2008 | Dudonis | A01M 31/02 182/150 |
| 2009/0250415 A1 * | 10/2009 | Sellers | A47B 96/027 211/13.1 |
| 2010/0102184 A1 * | 4/2010 | Gorsuch | F41A 23/18 248/218.4 |
| 2013/0186310 A1 * | 7/2013 | Lymberis | A47B 96/025 108/137 |
| 2014/0198490 A1 * | 7/2014 | Halseth | A47F 11/10 362/147 |
| 2016/0007730 A1 * | 1/2016 | Tichenor | A47B 5/02 108/25 |

* cited by examiner

Primary Examiner — Daniel J Rohrhoff
(74) Attorney, Agent, or Firm — Kyle A. Fletcher, Esq.

(57) ABSTRACT

The auxiliary shelf for hunting stand is an extension shelf that may be added adjacent to a hunting stand. The shelf comprises a metal mesh covering coupled to a tubular frame. A pair of parallel support arms are coupled to the bottom of the frame and extend away from the shelf so that they may be place under the tree stand. A pair of locking bars couple to the tree stand such that each locking bar squeezes both support arms between the locking bar and the tree stand. The locking bars each couple to the tree stand using a hook.

16 Claims, 4 Drawing Sheets

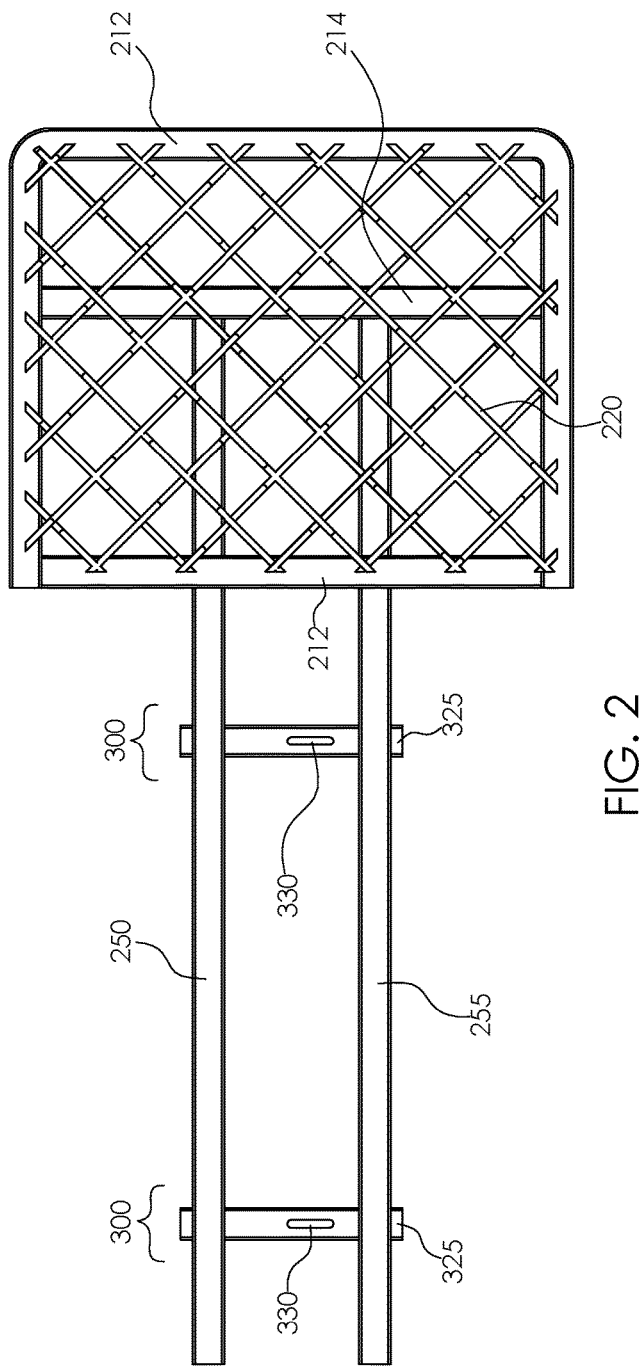
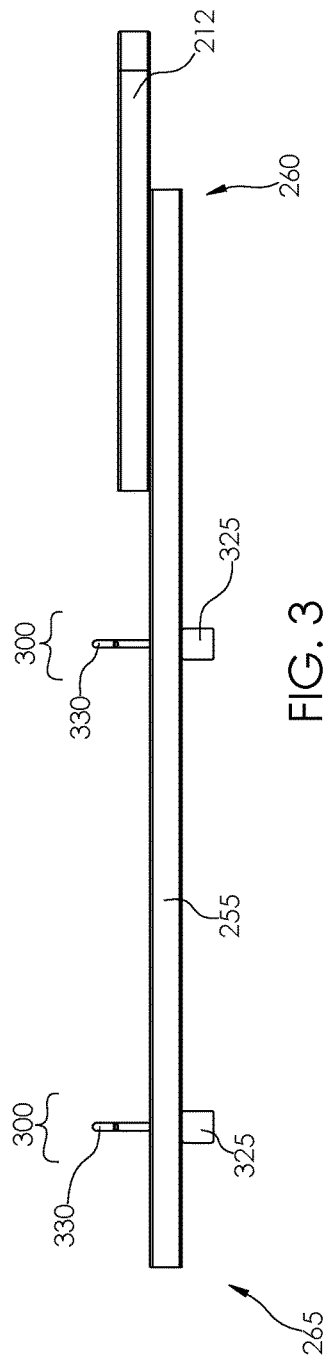
FIG. 2
FIG. 3

AUXILIARY SHELF FOR HUNTING STAND

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hunting equipment, more specifically, an auxiliary shelf for a hunting stand.

SUMMARY OF INVENTION

The auxiliary shelf for hunting stand is an extension shelf that may be added adjacent to a hunting stand. The shelf comprises a metal mesh covering coupled to a tubular frame. A pair of parallel support arms are coupled to the bottom of the frame and extend away from the shelf so that they may be place under the tree stand. A pair of locking bars couple to the tree stand such that each locking bar squeezes both support arms between the locking bar and the tree stand. The locking bars each couple to the tree stand using a hook.

An object of the invention is to provide an extension shelf adjacent to a tree stand.

Another object of the invention is to provide a pair of support arms coupled to the shelf for attaching the shelf to the tree sand.

A further object of the invention is to attach the support arms to the tree sand by capturing the support arms between the tree stand and a pair of locking bars.

Yet another object of the invention is to attach each locking bar to the tree stand using a hook.

These together with additional objects, features and advantages of the auxiliary shelf for hunting stand will be readily apparent to those of ordinary skill in the art upon reading the following detailed description of the presently preferred, but nonetheless illustrative, embodiments when taken in conjunction with the accompanying drawings.

In this respect, before explaining the current embodiments of the auxiliary shelf for hunting stand in detail, it is to be understood that the auxiliary shelf for hunting stand is not limited in its applications to the details of construction and arrangements of the components set forth in the following description or illustration. Those skilled in the art will appreciate that the concept of this disclosure may be readily utilized as a basis for the design of the other structures, methods, and systems for carrying out the several purposes of the auxiliary shelf for hunting stand.

It is therefore important that the claims be regarded as including such equivalent construction insofar as they do not depart from the spirit and scope of the auxiliary shelf for hunting stand. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a top view of an embodiment of the disclosure.
FIG. 3 is a side view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
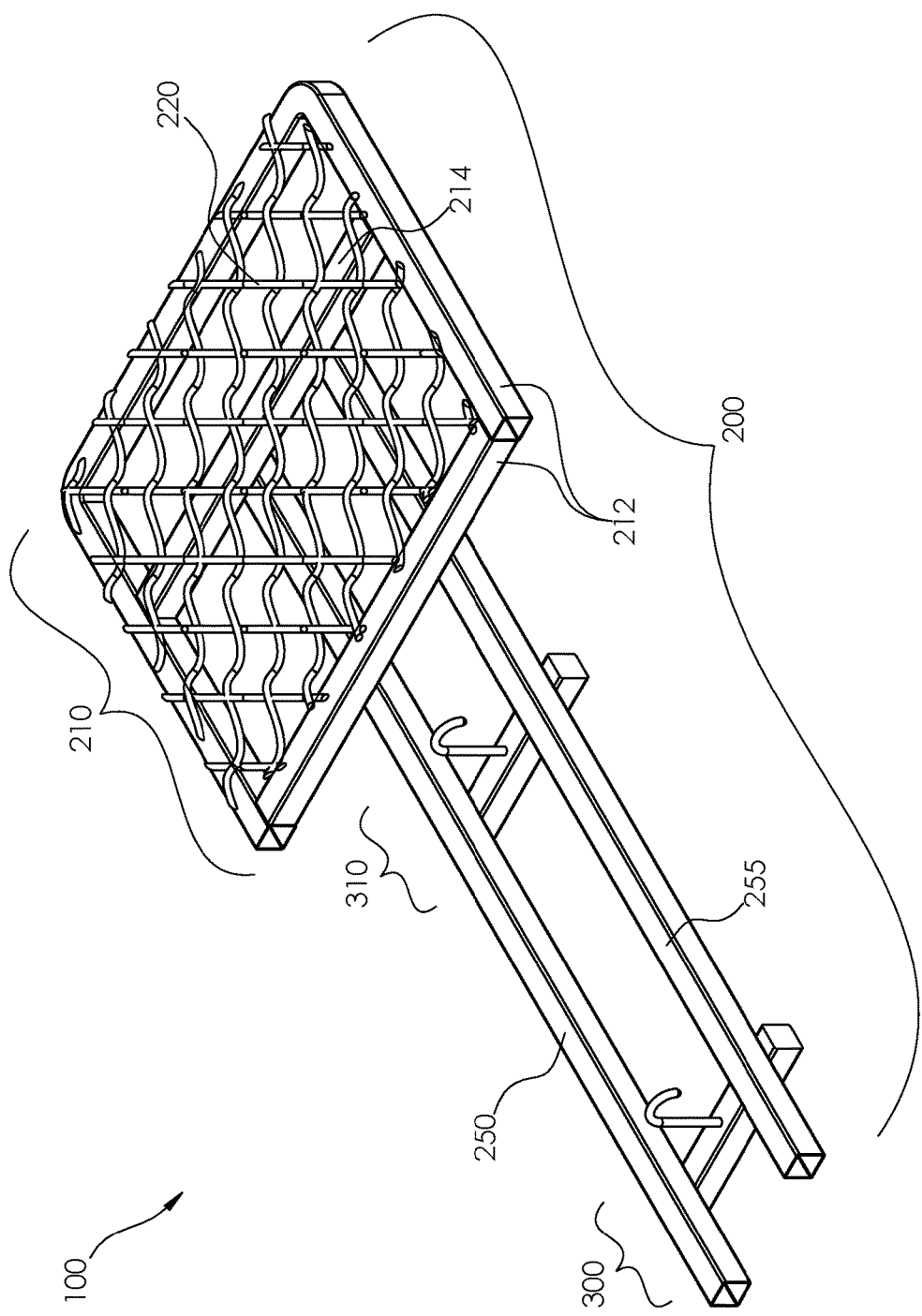
FIG. 1 is a perspective view of an embodiment of the disclosure.
Figure 4:
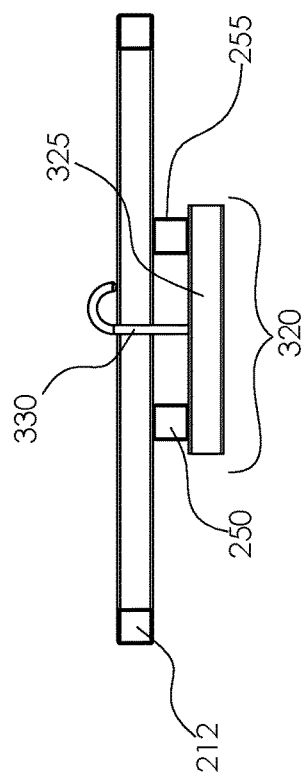
FIG. 4 is a rear view of an embodiment of the disclosure.
Figure 5:
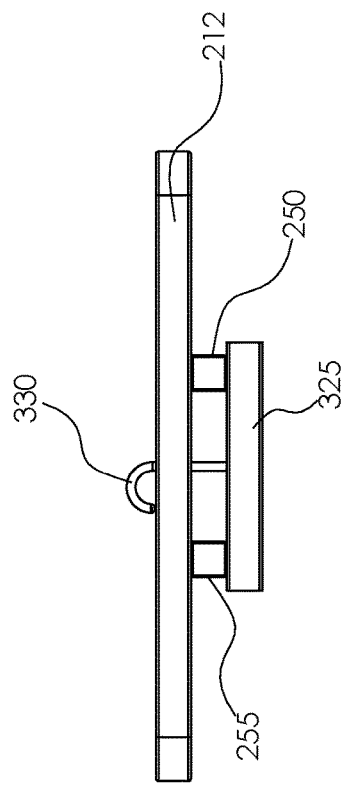
FIG. 5 is a front view of an embodiment of the disclosure.
Figure 6:
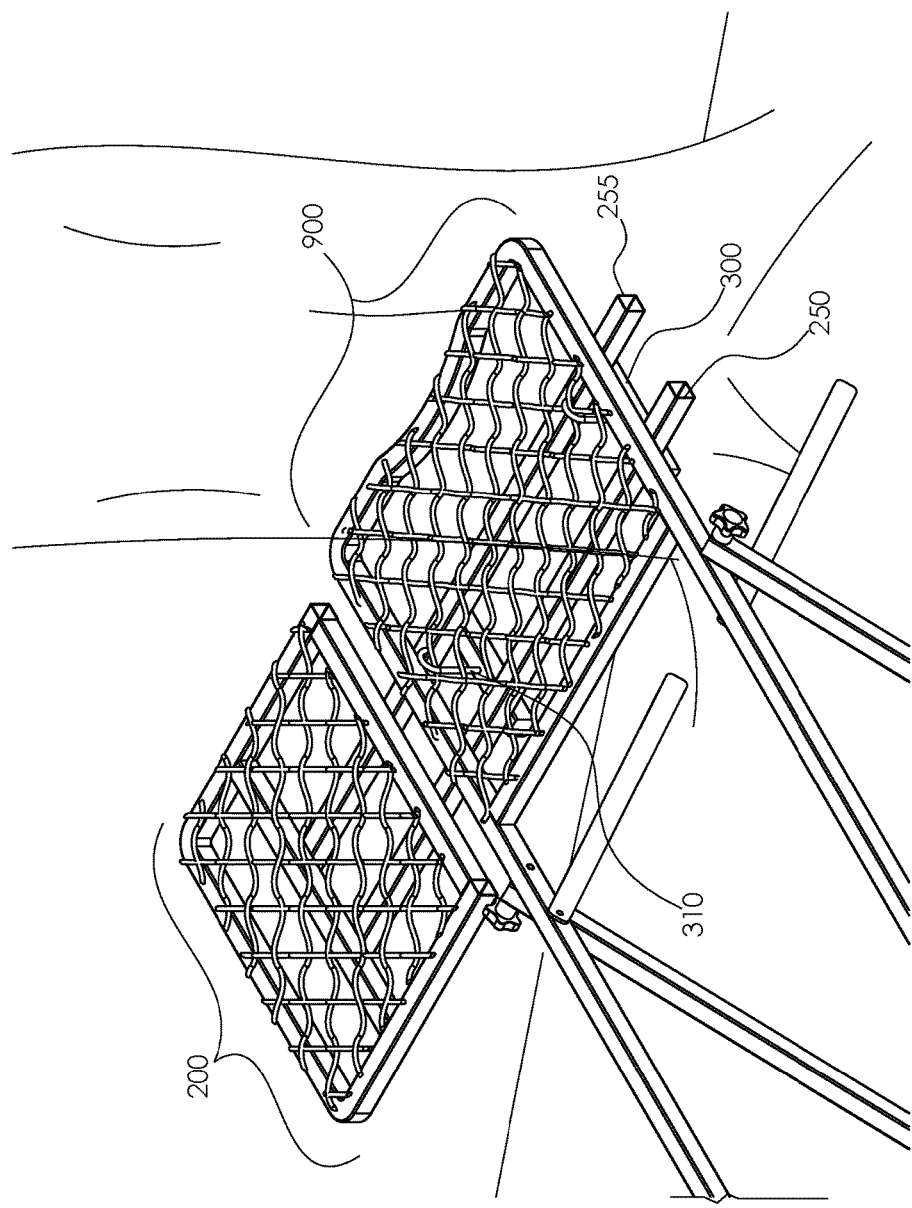
FIG. 6 is an in-use view of an embodiment of the disclosure illustrating the shelf attached to a tree stand.

Detailed reference will now be made to a first potential embodiment of the disclosure, which is illustrated in FIGS. 1 through 6.

The auxiliary shelf for hunting stand 100 (hereinafter invention) comprises a shelf 200, a first lock bar 300, and a second lock bar 310. The shelf 200 may be configured to attach to a tree stand 900 using the first lock bar 300 and the second lock bar 310. The shelf 200 may provide space for holding a hunting bag, supplies, and/or hunting accessories while hunting.

The shelf 200 comprises a frame 210, a covering 220, a first support arm 250, and a second support arm 255. The shelf 200 may be configured to attach to the tree stand 900 such that the shelf 200 provides a horizontal surface adjacent to the tree stand 900.

The frame 210 comprises a border 212 and one or more cross braces 214. The frame 210 may support the covering 220 and the weight of items placed on the shelf 200.

The border 212 may comprise one or more lengths of tubing that are bent and/or coupled to each other to form a rectangular edge for the shelf 200. As a non-limiting example, the coupling between the one or more lengths of tubing may be welds.

The one or more cross braces 214 may be one or more lengths of tubing that are coupled to opposing side of the border 212. The one or more cross braces 214 may provide additional support for the covering 220 and the weight of items placed on the shelf 200.

The covering 220 may be a metal mesh applied to the top of the shelf 200 and coupled to the border 212 and to the one or more cross braces 214. The covering 220 may prevent items from falling through the shelf 200. The covering 220 may be a mesh to avoid reducing visibility.

The first support arm 250 and the second support arm 255 may be armatures that couple at a distal end 260 of the armatures to the frame 210. The first support arm 250 and the second support arm 255 may each couple to the frame 210 at two or more contact points—on the border 212 and/or on the one or more cross braces 214. A proximal end 265 of the first support arm 250 and of the second support arm 255 may extend away from the border 212 to a point under the tree stand 900. The first support arm 250 and the second support arm 255 may be oriented to be parallel to each other.

The first lock bar 300 and the second lock bar 310 may attach the first support arm 250 and the second support arm 255 to the tree stand 900. The first lock bar 300 may be removably coupled to the tree stand 900 from underneath at one side of the tree stand 900. The second lock bar 310 may be removably coupled to the tree stand 900 from underneath at the opposing side of the tree stand 900.

An individual lock bar 320 selected from the first lock bar 300 or the second lock bar 310 may comprise a lock bar armature 325 and a lock bar hook 330. The lock bar armature 325 may be a bar or tubing at least as long as the lateral distance between the first support arm 250 and the second arm 255. The lock bar hook 330 may be coupled to the center of the lock bar armature 325. The individual lock bar 320 may be removably coupled to the tree stand 900 such that the first support arm 250 and the second support arm 255 are captured between the tree stand 900 and the individual lock bar 320.

Specifically, the shelf 200 may be placed next to the tree stand 900 with the first support arm 250 and the second support arm 255 extending beneath the tree stand 900. The individual lock bar 320 may be placed under the tree stand 900 and the lock bar hook 330 may be hooked onto mesh or a brace comprising the tree stand 900. The individual lock bar 320 may be rotated to bring the ends of the lock bar armature 325 beneath the first support arm 250 and the second support arm 255. Both the first lock bar 300 and the second lock bar 310 may be installed with separation between them. The separation distance may be at least the length of the individual lock bar 320.

In use, the tree stand 900 and the invention 100 may be carried to a location where the tree stand 900 is to be installed. The tree stand 900 may be assembled and the shelf 200 may be placed next to the tree stand 900 with the first support arm 250 and the second support arm 255 extending beneath the tree stand 900. The first lock bar 300 and the second lock bar 310 may be installed by placing them beneath the tree stand 900, hooking the lock bar hook 330 of the individual lock bars 320 onto the tree stand 900, and rotating the first lock bar 300 and the second lock bar 310 to capture the first support arm 250 and the second support arm 255 between the individual lock bars 320 and the tree stand 900. The tree stand 900, with the shelf 200 attached may then be elevated to a position in a tree for further use.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, a "brace" is a structural element that is used to support or otherwise steady an object.

As used herein, the words "couple", "couples", "coupled" or "coupling", refer to connecting, either directly or indirectly, and does not necessarily imply a mechanical connection.

As used in this disclosure, the terms "distal" and "proximal" may be used to describe relative positions. Distal refers to the object, or the end of an object, that is situated away from the point of origin, point of reference, or point of attachment. Proximal refers to the object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point or a central axis of an object and the direction of comparison may be in a radial or lateral direction.

As used in this disclosure, a "hook" is an object that is curved or bent at an angle such that items can be hung on or caught by the object or such that the object may be suspended from another object.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "lateral" refers to the sides of an object or movement towards a side. Lateral directions are generally perpendicular to longitudinal directions. "Laterally" refers to movement in a lateral direction.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A auxiliary shelf for hunting stand comprising:
   a shelf, a first lock bar, and a second lock bar;
   wherein the shelf is configured to attach to a tree stand using the first lock bar and the second lock bar;
   wherein the shelf provides space for holding a hunting bag, supplies, or hunting accessories while hunting;
   wherein the shelf comprises a frame, a covering, a first support arm, and a second support arm;

wherein the shelf is configured to attach to the tree stand such that the shelf provides a horizontal surface adjacent to the tree stand;

wherein an individual lock bar selected from the first lock bar or the second lock bar comprises a lock bar armature and a lock bar hook;

wherein the lock bar armature is a bar or tubing at least as long as the lateral distance between the first support arm and the second support arm;

wherein the shelf is placed next to the tree stand with the first support arm and the second support arm extending beneath the tree stand;

wherein the individual lock bar is placed under the tree stand and the lock bar hook is hooked onto mesh or a brace comprising the tree stand;

wherein the individual lock bar is rotated to bring the ends of the lock bar armature beneath the first support arm and the second support arm.

2. The auxiliary shelf for hunting stand according to claim 1 wherein the frame comprises a border and one or more cross braces;

wherein the frame supports the covering and the weight of items placed on the shelf.

3. The auxiliary shelf for hunting stand according to claim 2 wherein the border comprises one or more lengths of tubing that are bent or coupled to each other to form a rectangular edge for the shelf.

4. The auxiliary shelf for hunting stand according to claim 3 wherein the one or more cross braces are one or more lengths of tubing that are coupled to opposing sides of the border;

wherein the one or more cross braces provide additional support for the covering and the weight of items placed on the shelf.

5. The auxiliary shelf for hunting stand according to claim 4 wherein the covering is a metal mesh applied to the top of the shelf and coupled to the border and to the one or more cross braces;

wherein the covering prevents items from falling through the shelf.

6. The auxiliary shelf for hunting stand according to claim 5 wherein the covering is a mesh to avoid reducing visibility.

7. The auxiliary shelf for hunting stand according to claim 5 wherein the first support arm and the second support arm are armatures that couple at a distal end of the armatures to the frame.

8. The auxiliary shelf for hunting stand according to claim 7 wherein the first support arm and the second support arm each couple to the frame at two or more contact points on the border or on the one or more cross braces.

9. The auxiliary shelf for hunting stand according to claim 8 wherein a proximal end of the first support arm and of the second support arm extend away from the border to a point under the tree stand.

10. The auxiliary shelf for hunting stand according to claim 9 wherein the first support arm and the second support arm are oriented to be parallel to each other.

11. The auxiliary shelf for hunting stand according to claim 10 wherein the first lock bar and the second lock bar attach the first support arm and the second support arm to the tree stand.

12. The auxiliary shelf for hunting stand according to claim 11 wherein the first lock bar is removably coupled to the tree stand from underneath at one side of the tree stand.

13. The auxiliary shelf for hunting stand according to claim 12 wherein the second lock bar is removably coupled to the tree stand from underneath at the opposing side of the tree stand.

14. The auxiliary shelf for hunting stand according to claim 13 wherein the lock bar hook is coupled to the center of the lock bar armature.

15. The auxiliary shelf for hunting stand according to claim 14 wherein the individual lock bar is removably coupled to the tree stand such that the first support arm and the second support arm are captured between the tree stand and the individual lock bar.

16. The auxiliary shelf for hunting stand according to claim 15 wherein both the first lock bar and the second lock bar are installed with separation between them;

wherein the separation distance is at least the length of the individual lock bar.

* * * * *